United States Patent
Doleh et al.

(10) Patent No.: US 12,526,293 B2
(45) Date of Patent: Jan. 13, 2026

(54) METHOD, APPARATUS, SYSTEM, AND NON-TRANSITORY COMPUTER READABLE MEDIUM FOR IDENTIFYING AND PRIORITIZING NETWORK SECURITY EVENTS

(71) Applicant: Charles Schwab & Co., Inc, San Francisco, CA (US)

(72) Inventors: Yaser Doleh, Ann Arbor, MI (US); Peter Lam, San Gabriel, CA (US); Bashar Abouseido, Phoenix, AZ (US); Haylee Mills, Tempe, AZ (US); Nathan Hess, Tempe, AZ (US); Jake Olson, Waukesha, WI (US); Emily MacLeod, Phoenix, AZ (US); Sukhjit Singh, Summit, NJ (US); Ward Sladek, Omaha, NE (US); Justin King, Davenport, FL (US)

(73) Assignee: Charles Schwab & Co., Inc, San Francisco, CA (US)

( * ) Notice: Subject to any disclaimer, the term of this patent is extended or adjusted under 35 U.S.C. 154(b) by 223 days.

(21) Appl. No.: 18/304,232

(22) Filed: Apr. 20, 2023

(65) Prior Publication Data
US 2023/0344840 A1    Oct. 26, 2023

Related U.S. Application Data

(60) Provisional application No. 63/333,321, filed on Apr. 21, 2022.

(51) Int. Cl.
*H04L 9/40* (2022.01)
(52) U.S. Cl.
CPC .......... *H04L 63/1416* (2013.01); *H04L 63/20* (2013.01)

(58) Field of Classification Search
CPC . H04L 63/1416; H04L 63/20; H04L 63/1408; H04L 63/1433; H04L 63/1425; G06F 21/552; G06F 21/554; G06F 21/577
See application file for complete search history.

(56) References Cited

U.S. PATENT DOCUMENTS

| | | |
|---|---|---|
| 10,333,962 B1 | 6/2019 | Brandwine et al. |
| 11,055,405 B1 | 7/2021 | Jin et al. |

(Continued)

OTHER PUBLICATIONS

Kotenko et al., "An Approach to Aggregation of Security Events in Internet-of-Things Networks Based on Genetic Optimization", Jul. 2016, Intl IEEE Conferences on Ubiquitous Intelligence & Computing, pp. 657-664 (Year: 2016).*

(Continued)

*Primary Examiner* — Kenneth W Chang
(74) *Attorney, Agent, or Firm* — Harness, Dickey & Pierce, P.L.C.

(57) ABSTRACT

A server for identifying and prioritizing IT security events associated with a network is caused to receive a dataset representing IT security events specific to one or more resources associated with the network, generate, by defined algorithms, individual scores for the IT security events, correlate each of the individual scores for the IT security events with the one or more resources, aggregate, for a resource of the one or more resources, each of the individual scores correlated with the resource into a security score specific to the resource, determine whether the security score exceeds a defined threshold, and in response to the security score exceeding the defined threshold, generate and transmit a security incident alert specific to the resource to a security operation center. Example servers, systems, apparatuses, methods, and non-transitory computer readable medium for identifying and prioritizing IT security events associated with a network are also disclosed.

20 Claims, 4 Drawing Sheets

(56) References Cited

U.S. PATENT DOCUMENTS

| | | | | |
|---|---|---|---|---|
| 2007/0294187 | A1* | 12/2007 | Scherrer | H04L 63/1425 |
| | | | | 705/75 |
| 2009/0157574 | A1* | 6/2009 | Lee | H04L 63/1425 |
| | | | | 706/47 |
| 2013/0097183 | A1* | 4/2013 | McCracken | G06F 11/0709 |
| | | | | 707/E17.011 |
| 2015/0379072 | A1* | 12/2015 | Dirac | G06N 20/00 |
| | | | | 707/693 |
| 2017/0093902 | A1* | 3/2017 | Roundy | G06F 21/554 |
| 2018/0004948 | A1* | 1/2018 | Martin | H04L 63/1425 |
| 2018/0367561 | A1* | 12/2018 | Givental | H04L 63/1433 |
| 2019/0312890 | A1* | 10/2019 | Perilli | H04L 63/145 |
| 2020/0057850 | A1 | 2/2020 | Kraus et al. | |
| 2020/0285737 | A1* | 9/2020 | Kraus | G06F 21/552 |
| 2020/0334498 | A1* | 10/2020 | Pan | G06F 17/15 |
| 2021/0037035 | A1* | 2/2021 | Graul | H04L 41/22 |
| 2021/0126938 | A1 | 4/2021 | Trost et al. | |

OTHER PUBLICATIONS

PCT International Search Report and Written Opinion for PCT/2023/019290 filed Apr. 20, 2023; dated Jul. 11, 2023; 12 pages.

Jim Apger et al., "Say Goodbye to Your Big Alert Pipeline, and Say Hello to Your New Risk-Based Approach" Conf18, Splunk inc., Oct. 2018.

"Implementing risk-based alerting" splunk, pp. 1-7, downloaded Apr. 20, 2023<https://lantern.splunk.com/Security/Product_Tips/Enterprise_Security/Implementing_risk-based_alerting>.

Billy Huang et al., "Taking Back Control of your SOC with Risk Based Alerting" Guidepoint security, downloaded Apr. 20, 2023 https://www.guidepointsecurity.com/blog/taking-back-control-of-your-soc-with-risk-based-alerting/.

* cited by examiner

METHOD, APPARATUS, SYSTEM, AND NON-TRANSITORY COMPUTER READABLE MEDIUM FOR IDENTIFYING AND PRIORITIZING NETWORK SECURITY EVENTS

CROSS-REFERENCE TO RELATED APPLICATIONS

This application claims the benefit of U.S. Provisional Application No. 63/333,321 filed Apr. 21, 2022, the entire disclosure of which is incorporated by reference.

BACKGROUND

Field

Various example embodiments relate to methods, apparatuses, systems, and/or non-transitory computer readable media for identifying and prioritizing network security events, and more particularly, to methods, apparatuses, systems, and/or non-transitory computer readable media for identifying and prioritizing a collection of information technology (IT) security events based on an aggregated security score specific to one or more resources in a computing network.

Description of the Related Art

A security operation center (SOC) is responsible for monitoring security events associated with users and/or components, such as computing systems, network computing devices, applications, security devices, security software, etc. For example, the SOC may receive a vast number of alerts (e.g., hundreds, thousands, etc. of alerts per day) generated by security detection mechanisms. Such alerts are generated for each unique security event based on narrowly defined conditions and/or rules. Security analysts then investigate each security event individually to determine whether the security event is an actual security event (e.g., not a false positive event), the severity of the security event, and necessary steps to take to mitigate damage caused by the security event. Due to the large number of security events received by the SOC, SOC resources may become overburden resulting in alert fatigue. Additionally, because the security events are generated based on narrowly defined conditions and/or rules, a large portion of the security events may be noise (e.g., false positives, etc.) or too specific that something could be missed in the bigger picture. As such, SOC resources may be wasted on false positive security events and/or potentially severe security events may be disregarded without more context relative to other security events.

For example, a simplified user security scenario may include two users that are victims of a phishing email campaign. In this example, one user (user A) is compromised, and another user (user B) is not compromised. In conventional approaches, the SOC receives two alerts from an email perimeter security tool, one for the phishing email received by user A and one for the phishing email received by user B. Additionally, in conventional approaches, additional alerts may be generated due to user A being compromised. For example, the SOC may receive an alert from a proxy security tool indicating user A visited a website having an unknown security classification, an alert from anti-virus security tool indicating user A created a new daily scheduled job, and an alert from a data loss prevention (DLP) security tool indicating user A uploaded sensitive material to a website. As such, in this phishing email campaign example, five individual alerts may be received by the SOC, four relating to user A and one relating to user B. While the above simplified example includes only two users and five received alerts, a single security scenario may relate to numerous users and/or components in which the SOC receives a much larger number of individual alerts specific to the security scenario.

In some scenarios, conventional techniques to reduce overburden SOC resources may be employed. For example, scaling of SOC resources may be employed to divide particular security analysts and/or security events into tiers. Additionally, whitelisting of some users and/or components may be employed to approve access for the users and/or components while denying others. However, such techniques often result in diminishing returns, situational numbness, etc.

SUMMARY

At least one example embodiment is directed towards a server for identifying and prioritizing a collection of information technology (IT) security events associated with a network.

In at least one example embodiment, the server may include a memory storing computer readable instructions, and processing circuitry configured to execute the computer readable instructions to cause the server to, receive a dataset representing a plurality of IT security events associated with the network, the plurality of IT security events specific to one or more resources associated with the network, generate, by a plurality of defined algorithms, a plurality of individual scores for the plurality of IT security events, each individual score indicative that a possible security incident occurred, correlate, based on the received dataset, each of the individual scores for the plurality of IT security events with the one or more resources, aggregate, for a resource of the one or more resources, each of the individual scores correlated with the resource into a security score specific to the resource, determine whether the security score specific to the resource exceeds a defined threshold, and in response to the security score specific to the resource exceeding the defined threshold, generate and transmit a security incident alert specific to the resource to a security operation center (SOC), the security incident alert including each IT security event correlated with the resource.

Some example embodiments provide that the server is further caused to determine whether the security score specific to the resource exceeds the defined threshold in a defined period of time, and in response to the security score specific to the resource exceeding the defined threshold in the defined period of time, generate and transmit the security incident alert specific to the resource to the SOC.

Some example embodiments provide that the server is further caused to receive the dataset representing the plurality of IT security events associated with the network from a plurality of data sources.

Some example embodiments provide that the plurality of data sources includes at least one of logs from authentication processes, logs from accessing websites, and one or more machine learning models.

Some example embodiments provide that the server is further caused to store the dataset representing the plurality of IT security events in one or more databases.

Some example embodiments provide that the one or more resources includes at least one of an IP address, an individual, a virtual computing machine, and a physical computing machine.

Some example embodiments provide that the server is further caused to aggregate, for the resource, each of the individual scores correlated with the resource into the security score specific to the resource by summing each of the individual scores correlated with the resource.

Some example embodiments provide that at least one defined algorithm of the plurality of defined algorithms employs one or more machine learning models.

At least one example embodiment is directed towards a method for identifying and prioritizing a collection of IT security events associated with a network.

In at least one example embodiment, the method may include receiving a dataset representing a plurality of IT security events associated with the network, the plurality of IT security events specific to one or more resources associated with the network, generating, by a plurality of defined algorithms, a plurality of individual scores for the plurality of IT security events, each individual score indicative that a possible security incident occurred, correlating, based on the received dataset, each of the individual scores for the plurality of IT security events with the one or more resources, aggregating, for a resource of the one or more resources, each of the individual scores correlated with the resource into a security score specific to the resource, determining whether the security score specific to the resource exceeds a defined threshold, and in response to the security score specific to the resource exceeding the defined threshold, generating and transmitting a security incident alert specific to the resource to a SOC, the security incident alert including each IT security event correlated with the resource.

Some example embodiments provide that determining whether the security score specific to the resource exceeds the defined threshold includes determining whether the security score specific to the resource exceeds the defined threshold in a defined period of time, and generating and transmitting the security incident alert specific to the resource to the SOC includes generating and transmitting the security incident alert to the SOC in response to the security score specific to the resource exceeding the defined threshold in the defined period of time.

Some example embodiments provide that receiving the dataset representing the plurality of IT security events associated with the network includes receiving the dataset from a plurality of data sources.

Some example embodiments provide that the plurality of data sources includes at least one of logs from authentication processes, logs from accessing websites, and one or more machine learning models.

Some example embodiments provide that the method further includes storing the dataset representing the plurality of IT security events in one or more databases.

Some example embodiments provide that the one or more resources includes at least one of an IP address, an individual, a virtual computing machine, and a physical computing machine.

Some example embodiments provide that aggregating, for the resource, each of the individual scores correlated with the resource into the security score specific to the resource includes summing each of the individual scores correlated with the resource.

Some example embodiments provide that at least one defined algorithm of the plurality of defined algorithms employs one or more machine learning models.

At least one example embodiment is directed to a non-transitory computer readable medium.

In at least one example embodiment, the non-transitory computer readable medium stores computer readable instructions, which when executed by processing circuitry of a server, causes the server to, receive a dataset representing a plurality of IT security events associated with a network, the plurality of IT security events specific to one or more resources associated with the network, generate, by a plurality of defined algorithms, a plurality of individual scores for the plurality of IT security events, each individual score indicative that a possible security incident occurred, correlate, based on the received dataset, each of the individual scores for the plurality of IT security events with the one or more resources, aggregate, for a resource of the one or more resources, each of the individual scores correlated with the resource into a security score specific to the resource, determine whether the security score specific to the resource exceeds a defined threshold, and in response to the security score specific to the resource exceeding the defined threshold, generate and transmit a security incident alert specific to the resource to a SOC, the security incident alert including each IT security event correlated with the resource.

Some example embodiments provide that the server is further caused to determine whether the security score specific to the resource exceeds the defined threshold in a defined period of time, and in response to the security score specific to the resource exceeding the defined threshold in the defined period of time, generate and transmit the security incident alert specific to the resource to the SOC.

Some example embodiments provide that the server is further caused to receive the dataset representing the plurality of IT security events associated with the network from a plurality of data sources, and the plurality of data sources includes at least one of logs from authentication processes, logs from accessing websites, and one or more machine learning models.

Some example embodiments provide that at least one defined algorithm of the plurality of defined algorithms employs one or more machine learning models.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone, a smart device, and/or server, etc., to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

At least one example embodiment refers to methods, systems, devices, and/or non-transitory computer readable media for providing a risk based intelligent monitoring framework for identifying and prioritizing a collection of IT security events associated with a computing network. The risk based intelligent monitoring framework provides improvements over conventional alert generation systems by performing a unique risk scoring analysis of security events to reduce the number of alerts generated and transmitted to a security operation center (SOC) for monitoring and investigation while also providing the SOC with a contextual and holistic view of the security events and correlations therebetween. As such, the risk based intelligent monitoring framework ensures SOC resources are able to receive and focus their attention on crucial security events instead of false positives and other noise related events which may otherwise become overburdensome for the SOC resources. In this manner, the risk based intelligent monitoring framework optimizes the SOC and its resources and improves IT security.

According to at least one example embodiment, the risk based intelligent monitoring framework may receive a dataset representing multiple IT security events associated with a computing network. In such examples, the IT security events are specific to one or more resources associated with the computing network. For example, the IT security events may be specific to a unique internet protocol (IP) address, an individual (e.g., an employee, a customer, etc.), network computing devices (e.g., a virtual computing machine, a physical computing machine, servers, etc.), and/or any other entities associated with the computing network.

Then, according to at least one example embodiment, the risk based intelligent monitoring framework generates individual scores for the IT security events, with each individual score indicating a possible security incident occurred. For instance, each received security event may be provided one or more individual scores. In various embodiments, defined algorithms may be employed to generate such individual scores. In such examples, the algorithms may individually analyze and score the security events. For example, one algorithm may generate one score for a particular security event while another algorithm may generate another score for the same security event. In other examples, the received security event may be provided one or more individual scores based on a defined formula having various factors, such as a potential impact of the event, a confidence level of the event, one or more risk modifiers, etc.

The risk based intelligent monitoring framework may then correlate the individual scores for the IT security events with the one or more resources, and aggregate each of the individual scores correlated with a particular resource into a security score specific to that resource, according to at least one example embodiment. For instance, each individual score may be tied, linked, etc. to one or more resources (e.g., an individual, an IP address, etc.) based on the received dataset. Then, the individual scores for each resource may be combined into a security score specific to that resource. If the security score specific for any of the resources exceeds a defined threshold, then the risk based intelligent monitoring framework may generate and transmit a security incident alert specific to that resource to the SOC. In such examples, the security incident alert may include each IT security event correlated with the resource. As such, an alert is generated and provided to the SOC along with context of the alert only if a security score specific to a resource exceeds a defined threshold. In this manner, the risk based intelligent monitoring framework reduces the number of alerts generated and provided to the SOC, while also providing the SOC with a contextual and holistic view of the correlated security events.

Figure 1:
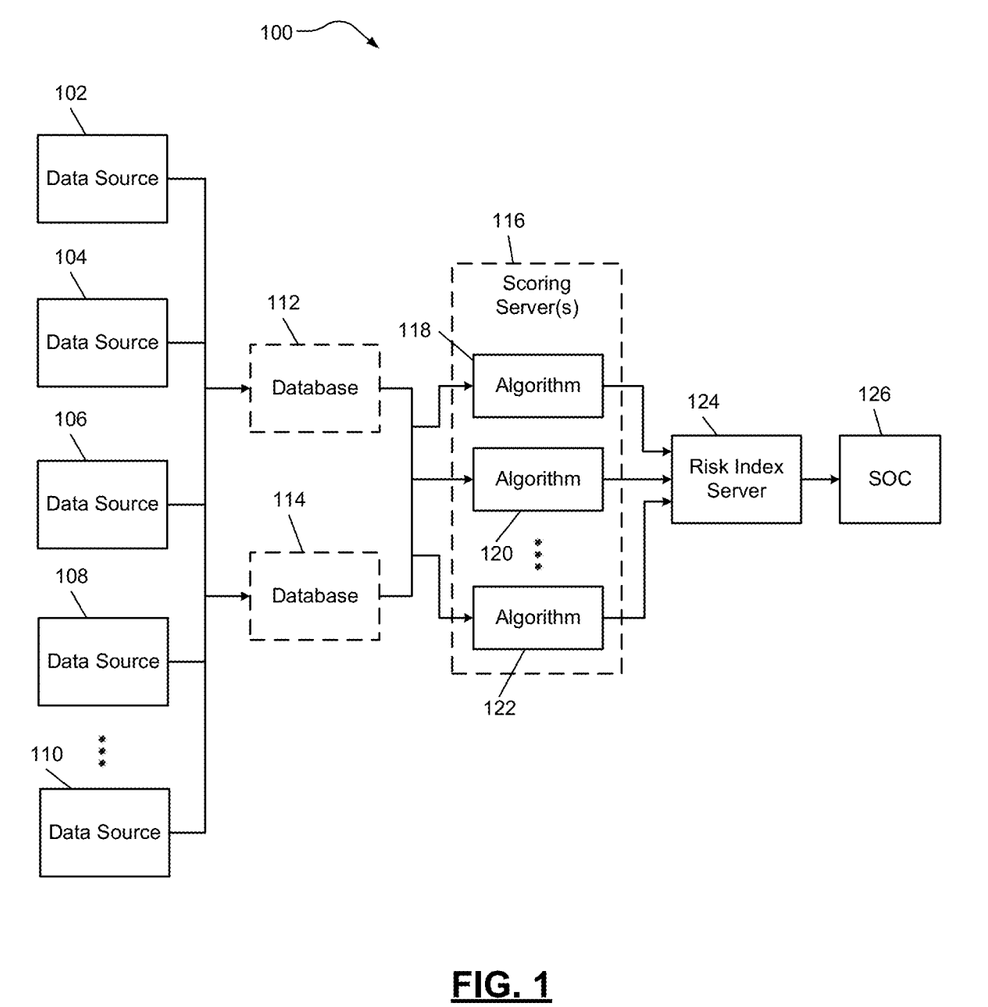
FIG. 1 illustrates a system associated with identifying and prioritizing security events for a security operation center (SOC) according to at least one example embodiment.

FIG. 1 illustrates a system 100 associated with a risk based intelligent monitoring framework according to at least one example embodiment. As shown in FIG. 1, the system 100 includes a scoring server 116, and a risk index server 124 in communication with the scoring server 116 and a SOC 126. While the system 100 of FIG. 1 is shown as including one scoring server 116 and one risk index server 124, it should be appreciated that the system 100 may include multiple scoring servers and/or multiple risk index servers if desired. Additionally, according to some example embodiments, the scoring server 116 and the risk index server 124 may be implemented as a single server, or one or more of the scoring server 116 and/or the risk index server 124 may be implemented as a plurality of servers, etc.

According to some example embodiments, the scoring server 116 receives one or more datasets representing IT security events associated with a computing network and specific to one or more resources. For example, the incoming data may provide an indicator of each security event and the associated resource(s) (e.g., an IP address, an individual, a virtual computing machine, a physical computing machine, servers, etc.) involved with the security event. For instance, the data may indicate a user received a phishing email, a user visited a website having an unknown security classification via a virtual computing machine, multiple user login failures within a defined period of time from multiple IP addresses, a user login from a new IP address, a user login from an IP address outside the country of residence, etc.

As shown in FIG. 1, the scoring server 116 may receive a dataset from one or more of data sources, such as data sources 102, 104, 106, 108, 110. While the scoring server 116 of FIG. 1 is shown as receiving data from five data sources, it should be appreciated that the scoring server 116 may receive data from less than five data sources (e.g., a single data source, etc.) or more than five data sources if desired.

In such examples, the data sources 102, 104, 106, 108, 110 may include logs from authentication processes (e.g., to an application, to a computing system, etc.), logs from accessing websites (e.g., external websites from a virtual computing machine, a physical computing machine, etc.), one or more machine learning models, etc. Such data sources may be generated, for example, by various security systems, management systems, and/or any other systems which provide a log output, such as intrusion detection/prevention systems, firewalls, anti-malware systems, endpoint detection and response systems, network behavior anomaly detection systems, data loss prevention systems, active directory (AD) systems, identity and access management (IAM) systems, web proxy systems, mainframe tools, network tools, etc. In various embodiments, the dataset or multiple datasets may be aggregated into a single stream and normalized (e.g., translated into a standardized format) to reduce variations in the received data. In other examples, the dataset or multiple datasets may be provided in multiple data streams.

In various embodiments, the collected IT security events may be stored in one or more databases, such as databases 112, 114 of FIG. 1. For example, the databases 112, 114 may store a description of each received security event and link that security event to one or more resources. In this manner, each security event may have some contextual information (e.g., the resource(s) involved, possible assets affected, type of accounts involved, etc.). In some examples, the security events may be distributed across the databases 112, 114 as desired, or all stored in a single database (e.g., in the databased 112).

The scoring server 116 may then generate individual scores for the received IT security events. In such examples, each individual score may indicate that a possible security incident occurred. For example, and as shown in FIG. 1, the scoring server 116 may include multiple algorithms 118, 120, 122 developed to act on the security events. For instance, the algorithms 118, 120, 122 each may generate an individual score (e.g., an individual risk value) for a security event. In various embodiments, the algorithms 118, 120, 122 may individually analyze and score the security events, such that one algorithm (e.g., the algorithm 118) may generate one score for a particular security event while another algorithm (e.g., the algorithm 120) may generate another score for the same security event. In this manner, any one or more of the algorithms 118, 120, 122 effectively votes of the received security event and provides a risk value to the security event.

In various embodiments, the algorithms 118, 120, 122 can be relatively simple or complex. For example, any one of the algorithms 118, 120, 122 may employ artificial intelligence (AI) models, such as one or more machine learning models. In such examples, the algorithm employing a machine learning model may detect risky user (e.g., employee, customer, etc.) authentication, and add a risk record with a score for that user, a risk record with a score for a particular account associated with the user, and/or a risk record with a score for the IP address associated with the computing device used by the user. In other examples, any one of the algorithms may include rule-based conditions for acting on the security events. For example, the rule-based conditions may be related to user login processes, website visits, etc. As examples only, the algorithms may include: if a user fails to login multiple times, add a risk record with a score for the user; if a customer attempts to login from a new IP address, add a risk record with a score for the customer, add a risk record with a score for the IP address and/or add a risk record with a score for the customer's account; if a customer attempts to login from an IP address outside the country of residence, add a risk record with a score for the customer, add a risk record with a score for the IP address and/or add a risk record with a score for the customer's account; and if an employee attempts multiple logins to an application that he/she is not authorized to access, add a risk record with a score for that employee.

In other examples, the algorithms 118, 120, 122 and/or other suitable scoring mechanisms may generate individual scores for the received IT security events based on at least one defined formula. In such examples, the defined formula may include various factors, such as a potential impact of the event, a confidence level of the event, a risk modifier, etc. Such factors may provide a dynamic scoring mechanism for the received security events.

For example, each received security event may be labeled with an impact value indicating a level of which the event may impact the system. For instance, a security event may be labeled with an impact value of 0 (e.g., no impact), 20 (e.g., minimal impact), 40 (e.g., low impact), 60 (e.g., medium impact), 80 (e.g., high impact), or 100 (e.g., critical impact). Additionally, the confidence level of the event may be labeled with a confidence value based on whether the event is believed to be a true positive event or a false positive event. For example, a security event may be labeled with a confidence value of 0 (e.g., indicating a false positive event), 0.3 (e.g., indicating a low level of confidence that the event is a true positive event), 0.6 (e.g., indicating a medium level of confidence that the event is a true positive event), or 1.0 (e.g., indicating a high level of confidence that the event is a true positive event). Further, the risk modifier may be a value associated with a particular user, component, and/or another resource that makes the event more or less critical. For example, the risk modifier value may be a defined integer (e.g., 0, 1, 2, etc.) representing whether a particular resource is a privileged resource or not. For instance, the risk modifier value may be higher for one user (e.g., a non-privileged user, such as an assistant, a contractor, etc.) as compared to another user (e.g., a privileged user, such as an IT employee). One example formula for generating an individual score for a security event based on a potential impact of the event, a confidence level of the event, and a risk modifier is shown below.

$$\text{Score} = \text{impact value} * \text{confidence value} * ((\text{risk modifier value} * 0.25) + 1)$$

The scoring server 116 may then provide the generated individual scores along with their associated IT security events to the risk index server 124. Once received, the risk index server 124 may correlate each of the individual scores for the IT security events with the one or more resources. For example, the individual scores and their associated IT security events may be populated into one or more indexes (e.g., stored in one or more databases) and attached (e.g., linked, etc.) to particular resource(s) involved with the security events based on the received dataset.

Then, the risk index server 124 may aggregate each of the individual scores correlated with a particular resource into a security score specific to that resource. For example, the risk index server 124 may sum the individual scores linked to a particular resource to generate the security score for that resource. In other examples, the risk index server 124 may generate the security score by summing the individual scores and applying a modifier to scale the combined score to a desired range. In still other examples, the risk index server 124 may sum only a portion of the individual scores corresponding to security events occurring within a defined period of time.

In various embodiments, the risk index server 124 may update a security score specific to a resource when new IT security events are received. For example, the risk index server 124 may calculate a security score for a resource, and then recalculate the security score for the resource at a later time as new security events (and associated individual scores) for that resource are provided to the risk index server 124. In such examples, the risk index server 124 may recalculate a security score for a resource periodically (e.g., on a regular, defined time interval), randomly, continuously, etc. In some examples, the risk index server 124 may recalculate a security score for a resource based on receiving a defined number of new security events, such as one new security event, two new security events, etc.

Once the security score is determined for a specific resource, the risk index server 124 may determine whether the security score exceeds a defined threshold. For example, the risk index server 124 may compare the security score to the defined threshold. In such examples, the threshold may be set and/or adjusted based on, for example, a desired volume of alerts for investigation, the specific resource, etc.

The risk index server 124 may then generate and transmit a security incident alert specific to the resource to the SOC 126, in response to the determined security score exceeding the defined threshold. In such examples, the risk index server 124 may include in the security incident alert each IT security event correlated with the resource. In various embodiments, the risk index server 124 generate and transmit a security incident alert to the SOC 126 only if the determined security score exceeds the defined threshold in a defined period of time (e.g., 1 hour, 12 hours, 1 day, 3 days, 1 week, etc.).

The security incident alert, including the IT security events correlated with the resource, may then be investigated. For example, security analysts and/or other resources associated with the SOC 126 may investigate the security incident alert and the security events leading up to the alert to obtain a holistic view of the alert. In such examples, if the security analysts finds the security incident alert applicable for a specific IP address, the SOC 126 may block that IP address from accessing other resources in the computing network. In other examples, the security analysts may determine that an employee's workstation was comprised (e.g., through a phishing email) based on the security incident alert. In such examples, the SOC 126 may isolate that particular workstation (e.g., a virtual computing machine, a physical computing machine, etc.) from the computing network.

While certain components of a system associated with a risk based intelligent monitoring framework are shown in FIG. 1, the example embodiments are not limited thereto, and the system may include components other than that shown in FIG. 1, which are desired, necessary, and/or beneficial for operation of the system.

Figure 2:
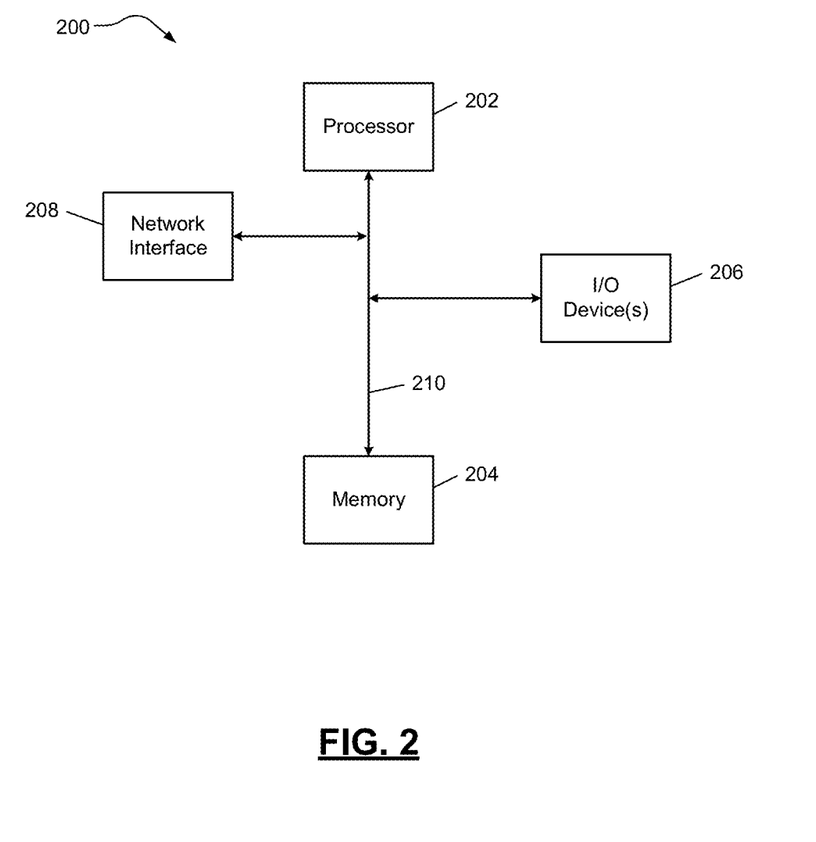
FIG. 2 illustrates a block diagram of an example computing device of the system of FIG. 1 according to at least one example embodiment.

FIG. 2 illustrates a block diagram of an example computing device 200 of the risk based intelligent monitoring framework according to at least one example embodiment. The computing device 200 of FIG. 2 may correspond to the scoring server 116 and/or the risk index server 124 of FIG. 1, but the example embodiments are not limited thereto.

As shown in FIG. 2, the computing device 200 may include processing circuitry (e.g., at least one processor 202), at least one communication bus 210, memory 204, at least one network interface 208, and/or at least one input/output (I/O) device 206 (e.g., a keyboard, a touchscreen, a mouse, a microphone, a camera, a speaker, etc.), etc., but the example embodiments are not limited thereto. In the example of FIG. 2, the memory 204 may include various special purpose program code including computer executable instructions which may cause the computing device 200 to perform the one or more of the methods of the example embodiments, including but not limited to computer executable instructions related to the risk based intelligent monitoring framework explained herein.

In at least one example embodiment, the processing circuitry may include at least one processor (and/or processor cores, distributed processors, networked processors, etc.), such as the processor 202, which may be configured to control one or more elements of the computing device 200, and thereby cause the computing device 200 to perform various operations. The processing circuitry (e.g., the processor 202, etc.) is configured to execute processes by retrieving program code (e.g., computer readable instructions) and data from the memory 204 to process them, thereby executing special purpose control and functions of the entire computing device 200. Once the special purpose program instructions are loaded (e.g., into the processor 202, etc.), the processor 202 executes the special purpose program instructions, thereby transforming the processor 202 into a special purpose processor.

In at least one example embodiment, the memory 204 may be a non-transitory computer-readable storage medium and may include a random access memory (RAM), a read only memory (ROM), and/or a permanent mass storage device such as a disk drive, or a solid state drive. Stored in the memory 204 is program code (i.e., computer readable instructions) related to operating the risk based intelligent monitoring framework as explained herein, such as the methods discussed in connection with FIGS. 3 and 4, the network interface 208, and/or the I/O device 206, etc. Such software elements may be loaded from a non-transitory computer-readable storage medium independent of the memory 204, using a drive mechanism (not shown) connected to the computing device 200, or via the network interface 208, and/or the I/O device 206, etc.

In at least one example embodiment, the at least one communication bus 210 may enable communication and/or data transmission to be performed between elements of the computing device 200. The bus 210 may be implemented using a high-speed serial bus, a parallel bus, and/or any other appropriate communication technology. According to some example embodiments, the computing device 200 may include a plurality of communication buses (not shown).

While FIG. 2 depicts an example embodiment of the computing device 200, the computing device 200 is not limited thereto, and may include additional and/or alternative architectures that may be suitable for the purposes demonstrated. For example, the functionality of the computing device 200 may be divided among a plurality of physical, logical, and/or virtual servers and/or computing devices, network elements, etc., but the example embodiments are not limited thereto.

Figure 3:
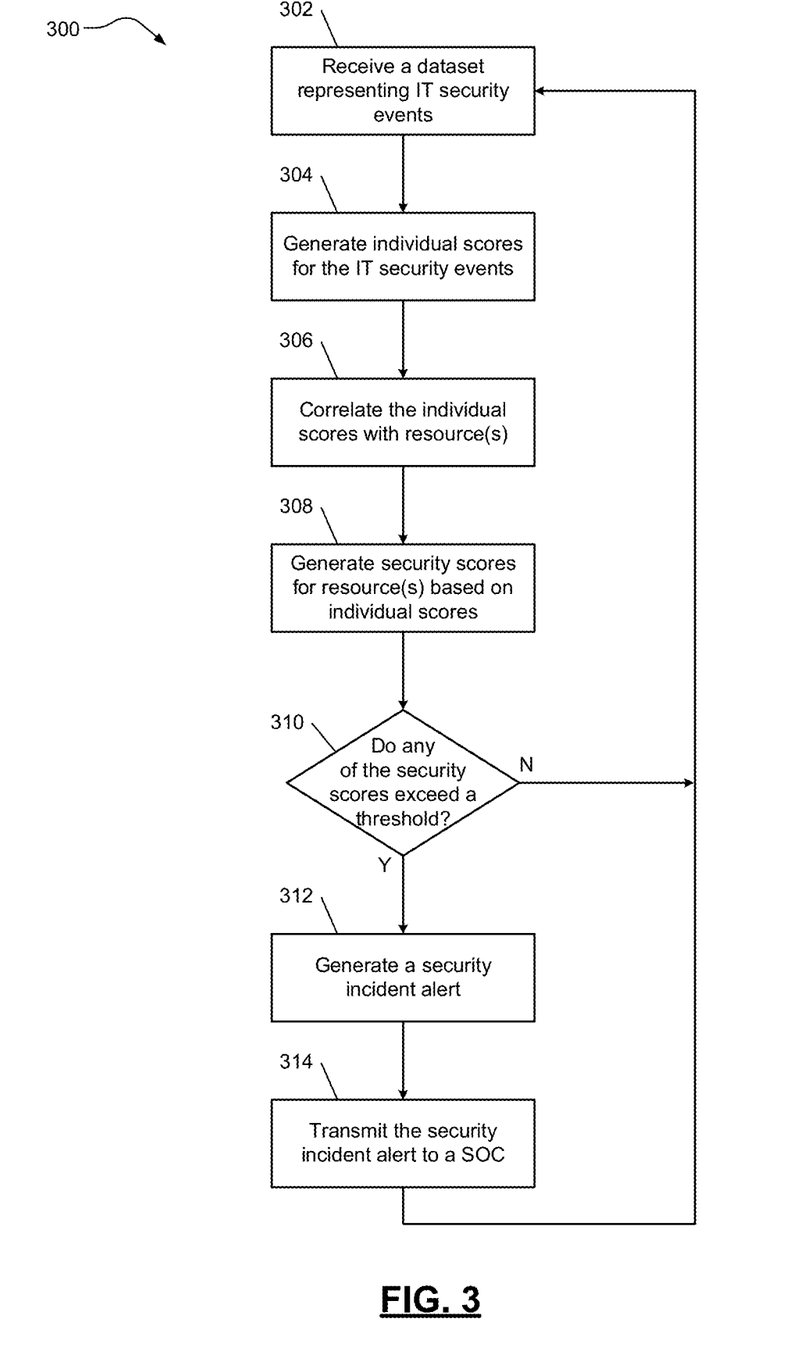
FIG. 3 illustrates an example method for identifying and prioritizing security events for a SOC according to at least one example embodiment.

FIG. 3 illustrates an example method 300 for identifying and prioritizing security events for a SOC according to at least one example embodiment. As shown, the method 300 begins in operation 302 where a server, such as the scoring server 116 of FIG. 1, may receive and/or obtain a dataset representing IT security events associated with a computing network. In such examples, the IT security events may be specific to one or more resources in the computing network as explained herein. In various embodiments, the dataset may be received by the scoring server 116 from one or more data sources, such as authentication logs, website access logs, one or more machine learning models, etc. as explained herein.

Next, in operation 304, the scoring server 116 may generate one or more individual scores for each received IT security event indicating that a possible security incident occurred. The individual scores may be generated by, for example, multiple defined algorithms and/or other suitable scoring mechanisms as explained herein. In operation 306, another server (e.g., the risk index server 124) may correlate each of the individual scores for the IT security events with one or more particular resources. In other words, each of the individual scores for the IT security events may be linked (or attached) to particular resource(s) involved with the security events.

In operation 308, the risk index server 124 may generate (e.g., calculate) security scores for each of the resources based on the determined individual scores. For example, the risk index server 124 may aggregate each of the individual scores correlated with a particular resource into a security score specific to that resource. In various embodiments, the risk index server 124 may aggregate each of the individual scores by summing the individual scores correlated with a particular resource, by summing the individual scores correlated with a particular resource and applying a modifier to scale the combined score to a desired range, etc. as explained herein.

Next, in operation 310, the risk index server 124 may determine whether any of the determined security scores specific to a particular resource exceeds a defined threshold. If not, the method 300 may return to operation 302 as shown in FIG. 3. If so, the risk index server 124 may generate a security incident alert for the particular resource in operation 312, and then transmit the security incident alert to a SOC (e.g., the SOC 126 of FIG. 1) in operation 314. In such examples, the security incident alert may include each IT security event correlated with the resource leading to the generated alert. In response to receiving the security incident alert for the particular resource, security analysts and/or other resources associated with the SOC may investigate the security incident alert and the security events leading to the alert to obtain a holistic view of the alert. The method 300 may then return to operation 302 as shown in FIG. 3.

Figure 4:
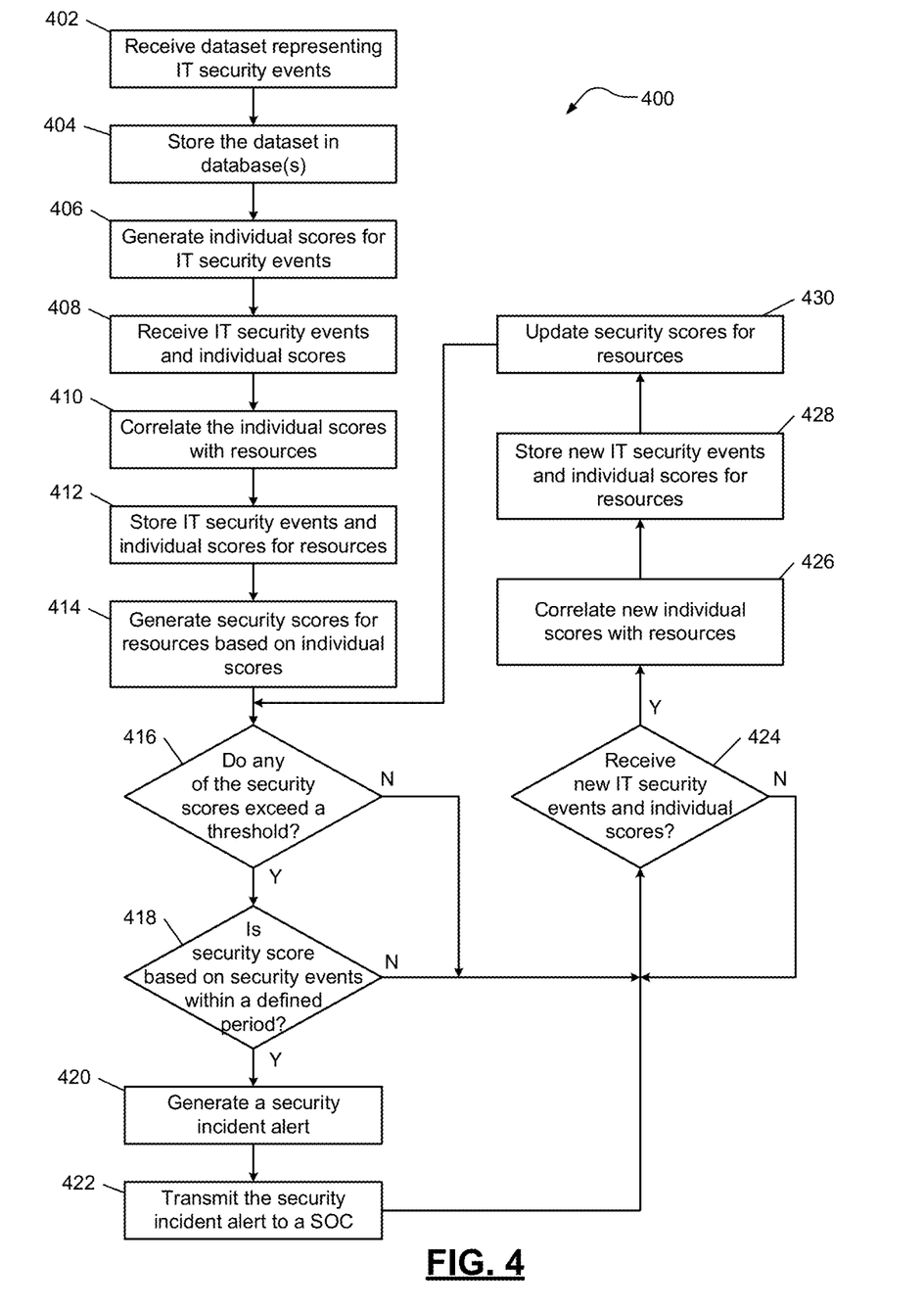
FIG. 4 illustrates another example method for identifying and prioritizing security events for a SOC according to at least one example embodiment.

FIG. 4 illustrates an example method 400 for identifying and prioritizing security events for a SOC according to at least one example embodiment. As shown, the method 400 of FIG. 4 includes some of the operations from the method 300 of FIG. 3. For example, the method 400 begins in operation 402 where a system (e.g., the system 100 of FIG. 1) or a server in the system may receive and/or obtain a dataset representing IT security events associated with a computing network as explained herein. Then, in operation 404, the system or the server may store the received dataset in one or more databases (e.g., the databases 112, 114 of FIG. 1). In such examples, the database(s) may store a description of each received security event and link that security event to one or more resources.

Next, in operation 406, one or more individual scores for each received IT security event may be generated as explained herein. In some embodiments, the individual scores may be generated by, for example, multiple defined algorithms and/or other suitable scoring mechanisms in the scoring server 116 of FIG. 1 as explained herein. The individual scores and their associated IT security events are then provided to (e.g., received by) the risk index server 124 of FIG. 1 in operation 408. Then, in operation 410, each of the individual scores for the IT security events is correlated with one or more particular resources (e.g., by the risk index server 124 of FIG. 1) as explained herein. The individual scores and their associated IT security events may be stored (e.g., in one or more databases) in operation 412 as shown in FIG. 4. For example, the individual scores and their associated IT security events may be populated into one or more indexes of one or more databases and attached (e.g., linked, etc.) to particular resource(s) involved with the security events. Then, in operation 414, the risk index server 124 may generate (e.g., calculate) security scores for each of the resources based on the determined individual scores by, for example, summing the individual scores correlated with a particular resource, summing the individual scores correlated with a particular resource and applying a modifier to scale the combined score to a desired range, etc. as explained herein.

In operation 416, the risk index server 124 may determine whether any of the determined security scores specific to a particular resource exceeds a defined threshold as explained herein. If not, the method 400 may proceed to operation 424 as shown in FIG. 4. If so, the risk index server 124 may then determine, in operation 418, whether the security score exceeding the defined threshold is based on IT security events within a defined period of time (e.g., 1 hour, 12 hours, 1 day, 3 days, 1 week, etc.). If not, the method 400 may proceed to operation 424. If yes, the risk index server 124 may generate a security incident alert for the particular resource in operation 420, and then transmit the security incident alert to a SOC (e.g., the SOC 126 of FIG. 1) in operation 422 as explained herein. In response to receiving the security incident alert for the particular resource, security analysts and/or other resources associated with the SOC may investigate the security incident alert and the security events leading to the alert to obtain a holistic view of the alert. The method 400 may then proceed to operation 424 as shown in FIG. 4, return to another suitable operation in FIG. 4, or end if desired.

In operation 424, the risk index server 124 may determine whether any new IT security events and associated individual scores are received. For example, in the example method 400 of FIG. 4, additional datasets representing new IT security events may be obtained and stored. In such examples, the scoring server 116 (e.g., through the algorithms and/or other suitable scoring mechanisms) may generate individual scores for the new IT security events as explained herein. Then, the risk index server 124 may receive the new IT security events and their associated individual scores from the scoring server 116. If the risk index server 124 receives any new IT security event and its associated individual score, the method 400 proceeds to operation 426. Otherwise, the method 400 may return to operation 424 as shown in FIG. 4, return to another suitable operation in FIG. 4, or end if desired.

Then, in operation 426, the risk index server 124 may correlate each new individual score with one or more resources as explained herein. Next, the new individual scores and their associated new IT security events may be stored in operation 428 as shown in FIG. 4. The method 400 then proceeds to operation 430, where the risk index server 124 may update the security scores for the resources based on the previously determined individual scores and the newly determined individual scores. In some examples, the risk index server 124 may update the security scores based on only previously determined individual scores within a defined period of time and the newly determined individual scores. In either case, the security scores for the resources may be recalculated to take into account the new IT security events as the new events arrive. In various embodiments, the security scores may be updated periodically (e.g., on a regular, defined time interval), randomly, continuously, etc. as new IT security events arrive. The method 400 may then return to operation 416 as shown in FIG. 4, where the risk index server 124 may determine whether any of the updated security scores specific to a particular resource exceeds a defined threshold as explained herein.

While FIGS. 3 and 4 illustrate various methods for identifying and prioritizing security events for a SOC, the example embodiments are not limited thereto, and other methods may be used and/or modifications to the methods of FIGS. 3 and/or 4 may be used to perform the identification and prioritization of security events for a SOC. For example, in various embodiments, the method 300 of FIG. 3 may include similar operations as the method 400 of FIG. 4 for updating security scores (e.g., periodically, randomly, continuously, etc.) as new IT security events arrive.

Various example embodiments are directed towards an improved device, system, method and/or non-transitory computer readable medium for providing a risk based intelligent monitoring framework for identifying and prioritizing a collection of IT security events associated with a computing network. In various embodiments, the risk based intelligent monitoring framework executes a unique risk scoring analysis of security events to reduce the number of alerts generated and transmitted to a SOC while also providing the SOC with a contextual and holistic view of the security events and correlations therebetween. In this manner, the risk based intelligent monitoring framework provides improvements over conventional alert generation systems which generate and transmit an overwhelming number of alerts (e.g., hundreds, thousands, etc. of alerts per day) to a SOC without a holistic view of possible security events associated with the alerts. As a result, the risk based intelligent monitoring framework allows SOC resources to focus their attention on crucial security events instead of false positives and other noise related events, thereby optimizing the use of SOC resources and improving IT security.

This written description uses examples of the subject matter disclosed to enable any person skilled in the art to practice the same, including making and using any devices, systems, and/or non-transitory computer readable media, and/or performing any incorporated methods. The patentable scope of the subject matter is defined by the claims, and may include other examples that occur to those skilled in the art. Such other examples are intended to be within the scope of the claims.

What is claimed is:

1. A server for identifying and prioritizing a collection of information technology (IT) security events associated with a network, the server comprising:
a memory storing computer readable instructions; and
processing circuitry configured to execute the computer readable instructions to cause the server to,
receive a dataset representing a plurality of IT security events associated with the network, the plurality of IT security events specific to one or more resources associated with the network,
generate, by each of a plurality of defined algorithms, a plurality of individual scores for the plurality of IT security events, each individual score indicative that a possible security incident occurred, the plurality of defined algorithms including a first defined algorithm employing one or more machine learning models and a second defined algorithm employing one or more rule-based conditions, wherein the first defined algorithm and the second defined algorithm each generates an individual score for each IT security event,
correlate, based on the received dataset, each of the individual scores for the plurality of IT security events with the one or more resources,
aggregate, for a resource of the one or more resources, each of the individual scores correlated with the resource into a security score specific to the resource,
determine whether the security score specific to the resource exceeds a defined threshold,
in response to the security score specific to the resource exceeding the defined threshold, generate and transmit a security incident alert specific to the resource to a security operation center (SOC), the security incident alert including each IT security event correlated with the resource, and
in response to the security score specific to the resource not exceeding the defined threshold, update the security score specific to the resource only after receiving a plurality of new IT security events.

2. The server of claim 1, wherein the processing circuitry is further configured to execute the computer readable instructions to cause the server to:
determine whether the security score specific to the resource exceeds the defined threshold in a defined period of time, and
in response to the security score specific to the resource exceeding the defined threshold in the defined period of time, generate and transmit the security incident alert specific to the resource to the SOC.

3. The server of claim 1, wherein the processing circuitry is further configured to execute the computer readable instructions to cause the server to receive the dataset representing the plurality of IT security events associated with the network from a plurality of data sources.

4. The server of claim 3, wherein the plurality of data sources includes at least one of logs from authentication processes, logs from accessing websites, and one or more machine learning models.

5. The server of claim 1, wherein the processing circuitry is further configured to execute the computer readable instructions to cause the server to store the dataset representing the plurality of IT security events in one or more databases.

6. The server of claim 1, wherein the one or more resources includes at least one of an IP address, an individual, a virtual computing machine, and a physical computing machine.

7. The server of claim 1, wherein the processing circuitry is further configured to execute the computer readable instructions to cause the server to aggregate, for the resource, each of the individual scores correlated with the resource into the security score specific to the resource by summing each of the individual scores correlated with the resource.

8. The server of claim 1, wherein the plurality of defined algorithms includes a third defined algorithm employing one or more defined formulas, and the first defined algorithm, the second defined algorithm, and the third defined algorithm each generates an individual score for each IT security event.

9. A method for identifying and prioritizing a collection of information technology (IT) security events associated with a network, the method comprising:
receiving a dataset representing a plurality of IT security events associated with the network, the plurality of IT security events specific to one or more resources associated with the network,
generating, by each of a plurality of defined algorithms, a plurality of individual scores for the plurality of IT security events, each individual score indicative that a possible security incident occurred, the plurality of defined algorithms including a first defined algorithm employing one or more machine learning models and a second defined algorithm employing one or more rule-based conditions, wherein the first defined algorithm and the second defined algorithm each generates an individual score for each IT security event, correlating, based on the received dataset, each of the individual scores for the plurality of IT security events with the one or more resources, aggregating, for a resource of the one or more resources, each of the individual scores correlated with the resource into a security score specific to the resource, determining whether the security score specific to the resource exceeds a defined threshold, in response to the security score specific to the resource not exceeding the defined threshold, updating the security score specific to the resource only after receiving a plurality of new IT security events, and in response to the updated security score specific to the resource exceeding the defined threshold, generating and transmitting a security incident alert specific to the resource to a security operation center (SOC), the security incident alert including each IT security event correlated with the resource.

10. The method of claim 9, wherein:

determining whether the security score specific to the resource exceeds the defined threshold includes determining whether the security score specific to the resource exceeds the defined threshold in a defined period of time, and generating and transmitting the security incident alert specific to the resource to the SOC includes generating and transmitting the security incident alert to the SOC in response to the security score specific to the resource exceeding the defined threshold in the defined period of time.

11. The method of claim 9, wherein receiving the dataset representing the plurality of IT security events associated with the network includes receiving the dataset from a plurality of data sources.

12. The method of claim 11, wherein the plurality of data sources includes at least one of logs from authentication processes, logs from accessing websites, and one or more machine learning models.

13. The method of claim 12, further comprising storing the dataset representing the plurality of IT security events in one or more databases.

14. The method of claim 9, wherein the one or more resources includes at least one of an IP address, an individual, a virtual computing machine, and a physical computing machine.

15. The method of claim 9, wherein aggregating, for the resource, each of the individual scores correlated with the resource into the security score specific to the resource includes summing each of the individual scores correlated with the resource.

16. The method of claim 9, wherein the plurality of defined algorithms includes a third defined algorithm employing one or more defined formulas, and the first defined algorithm, the second defined algorithm, and the third defined algorithm each generates an individual score for each IT security event.

17. A non-transitory computer readable medium storing computer readable instructions, which when executed by processing circuitry of a server, causes the server to:

receive a dataset representing a plurality of information technology (IT) security events associated with a network, the plurality of IT security events specific to one or more resources associated with the network, generate, by each of a plurality of defined algorithms, a plurality of individual scores for the plurality of IT security events, each individual score indicative that a possible security incident occurred, the plurality of defined algorithms including a first defined algorithm employing one or more machine learning models and a second defined algorithm employing one or more rule-based conditions, wherein the first defined algorithm and the second defined algorithm each generates an individual score for each IT security event, correlate, based on the received dataset, each of the individual scores for the plurality of IT security events with the one or more resources, aggregate, for a resource of the one or more resources, each of the individual scores correlated with the resource into a security score specific to the resource, determine whether the security score specific to the resource exceeds a defined threshold, in response to the security score specific to the resource exceeding the defined threshold, generate and transmit a security incident alert specific to the resource to a security operation center (SOC), the security incident alert including each IT security event correlated with the resource, and in response to the security score specific to the resource not exceeding the defined threshold, update the security score specific to the resource only after receiving a plurality of new IT security events.

18. The non-transitory computer readable medium of claim 17, wherein the server is further caused to:

determine whether the security score specific to the resource exceeds the defined threshold in a defined period of time, and in response to the security score specific to the resource exceeding the defined threshold in the defined period of time, generate and transmit the security incident alert specific to the resource to the SOC.

19. The non-transitory computer readable medium of claim 17, wherein:

the server is further caused to receive the dataset representing the plurality of IT security events associated with the network from a plurality of data sources, and the plurality of data sources includes at least one of logs from authentication processes, logs from accessing websites, and one or more machine learning models.

20. The non-transitory computer readable medium of claim 17, wherein the plurality of defined algorithms includes a third defined algorithm employing one or more defined formulas, and the first defined algorithm, the second defined algorithm, and the third defined algorithm each generates an individual score for each IT security event.

* * * * *